United States Patent [19]
Onodera et al.

[11] Patent Number: 5,177,775
[45] Date of Patent: Jan. 5, 1993

[54] REAL-TIME DIGITAL RADIOGRAPHY SYSTEM

[75] Inventors: Yoichi Onodera, Hachioji; Hisatake Yokouchi, Nishitama; Akiho Takahashi, Funabashi; Koichi Koike, Kashiwa, all of Japan

[73] Assignee: Hitachi Medical Corporation, Tokyo, Japan

[21] Appl. No.: 669,465

[22] Filed: Mar. 14, 1991

[30] Foreign Application Priority Data

Mar. 16, 1990 [JP] Japan ................................. 2-64315

[51] Int. Cl.$^5$ ............................................. H05G 1/64
[52] U.S. Cl. ...................................... 378/99; 378/62; 378/114; 358/111
[58] Field of Search ................. 378/99, 62, 63, 98, 378/114–116; 358/111

[56] References Cited

U.S. PATENT DOCUMENTS

| 4,563,701 | 1/1986 | Gilath et al. | 378/99 |
| 4,706,268 | 11/1987 | Onodera | 378/99 |

FOREIGN PATENT DOCUMENTS

5558682 5/1979 Japan.
1277065 11/1989 Japan.

*Primary Examiner*—David P. Porta
*Attorney, Agent, or Firm*—Antonelli, Terry, Stout & Kraus

[57] ABSTRACT

A real-time digital radiography system operates to introduce a X-ray image on a real-time basis and process the image for clinical diagnosis. The system provides for additional inputs, for example, clinical information material, which are also subject to digital image conversion. The system is designed to connect several TV cameras to an A/D converter which digitally converts the produced image to digital information, with one of the TV cameras for imaging the output image of an X-ray image intensifier, and the output of the one TV camera is selectively connected to the A/D converter. The output image of the X-ray image intensifier and other output images produced by separate TV cameras are connected to the A/D converter through a switching apparatus, and subsequently the digital output is processed.

7 Claims, 4 Drawing Sheets

REAL-TIME DIGITAL RADIOGRAPHY SYSTEM

BACKGROUND OF THE INVENTION

The present invention relates to a real-time digital radiography system used in an application field; the application field employs a television (TV) camera as an image input means. The television camera is used in the application field where an X-ray image is employed on a real-time basis and the image is processed for clinical diagnosis.

Recently, in the field of diagnosis employer's the X-ray image, the diagnosis relies on a X-ray film; additionally there is a growing expectation for the real-time digital radiography system which provides the diagnosis concurrently with image making so that the treatment plan can be obtained promptly. The real-time digital radiography system is made up of an X-ray TV camera system including an X-ray image intensifier, coupling optics and a TV camera, an image processor which processes the image formed by the transmission of the X-rays through the human body and converted into digital data with an A/D converter, a display unit, and a memory unit. The system is capable of processing, displaying and memorizing the image on a real-time basis.

It has been possible to some extent in the past to express the X-ray image information quantitatively by digital conversion, and this technique has been used for the quantitative diagnosis. The digital conversion of image has allowed the reduction of image storage space and the simplification of search work through the electronic filing of images, and further allowed the transaction of images with external systems over networks such as the Picture Archiving Communication System (PACS).

The real-time digital radiography system having various advantages as mentioned above has been put into practice in the field of heart and vascular clinics, as disclosed in Japanese Patent Provisional Publication No.55-58682 for example, and it is now applied extensively in clinics. However, these conventional systems are deficient in the resolution of output image, and at present they still remain as an assistant role for the diagnosis based on the X-ray image recorded on the film.

More recently, there has been developed a high precision real-time digital radiography system having enhanced resolution as compared with the conventional system, as disclosed in Japanese Patent Provisional Publication No.01-277065. This system can now produce images of heart and digestive organs from the usual X-ray film at a resolution comparable to the X-ray film having enhanced sensitivity.

The real-time digital radiography system will further be improved to have higher resolution, and its range of application will extend deep into the field of X-ray image diagnosis.

However, in order for the real-time digital radiography system to become prevalent, the following unsolved problem must be overcome.

At the transition from the diagnosis based on the X-ray film which is currently the major source of the X-ray image diagnosis, there arises the need for storing a vast accumulation of clinical information materials including X-ray films, inspection reports, patient's clinical charts, for example. Although the introduction of the real-time digital radiography system will replace X-ray films with digital images progressively and simplify their handling, large quantities of inspection reports, patient's clinical charts and old X-ray films are left intact. At the site of the usual diagnosis, an X-ray image, an inspection report and patient's clinical charts are usually accessed at the same time, and therefore digital conversion of X-ray image alone provides little advantage. In fact, the real-time digital radiography system exerts its full advantage when the above-mentioned clinical information materials are all converted into digital and they are accessed concurrently and randomly, and in this case, the system can readily be connected to such a network as PACS and it allows information transaction through network terminals installed in proper places.

Due to the foregoing background situation, the real-time digital radiography system necessitates, besides the function of direct introduction of X-ray image and its digital conversion, an additional function of entering other clinical information material as digital images, thereby overcoming the foregoing prior art deficiency and enhancing the system value.

SUMMARY OF THE INVENTION

In order to solve the foregoing problem, the real-time digital radiography system of this invention is based on two kinds of apparatus which follows.

(1) A plurality of TV cameras can be connected between a TV camera 31 which images the output picture of an X-ray image intensifier (indicated by 4 in FIG. 1) and A/D converters 7 and 15, which convert the image into a digital signal, with one of the TV cameras being selectively connected to the A/D converter 7 or 15 through switching means 32 and 21, so that the output picture of the X-ray image intensifier 4 and other picture 30 produced by separate TV cameras 31 and 31' are introduced to the A/D converter 15 or 7 through the switching means 32 and 21, and the outputs of the A/D converters 7 and 15 are processed in the common system.

Figure 3:
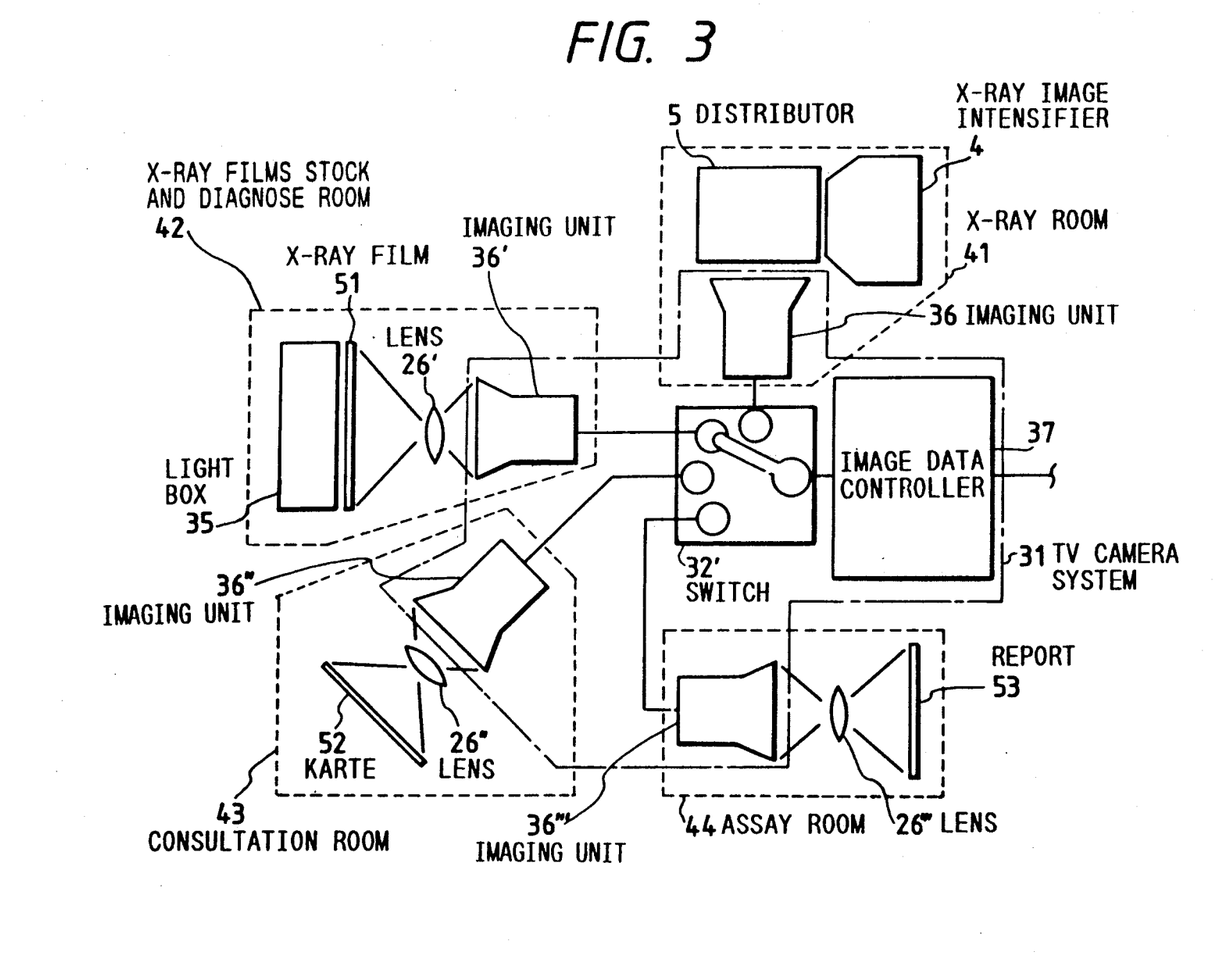
FIG. 3 is a block diagram showing a second embodiment of the use of the inventive system.

(2) A TV camera comprises an image sensing part (indicated by 36-36''' in FIG. 3) including an imaging device which converts an image into an electrical signal, an electronic circuit system (including a TV camera) for controlling and driving the imaging device and a pre-amplifier (not shown) for amplifying the output of the imaging device, and a control part (indicated by 37 in FIG. 3) including an electronic circuit system which generally controls the image sensing part, an electronic circuit which shapes the output of the image sensing part and delivers the shaped output to an external apparatus, and a power supply circuit system for the overall TV camera, wherein a plurality of image sensing parts can be connected between the above-mentioned image sensing part and the control part, with one of the image sensing parts being connected selectively to the control part by a switching means shown by 32' in FIG. 3, so that the output image of the X-ray image intensifier and other images (indicated by 51-53 in FIG. 3) produced by separate image sensing parts (indicated by 36-36''' in FIG. 3) are introduced to the control part 37 through the switch 32', and the outputs of the control part are processed in the common system. (The switching means to the A/D converters used in item (1) are not required in this case.)

DESCRIPTION OF THE PREFERRED EMBODIMENT

In dealing with images of several different types and different qualities, as in the foregoing conventional system, it is not advantageous economically to prepare radiography systems with individual digital conversion functions for these images. A TV camera has a superior performance as an image input device despite its relatively low price, and, on the other hand, the real-time digital radiography system does not need to receive images from several image sensing parts simultaneously.

Based on these facts, and in accordance with this invention, the real-time digital radiography system is designed to have a plurality of TV cameras with the additional provision of a switching means as mentioned in item (1) of the preceding paragraph, so that the system performance includes functions of a plurality of image input devices.

A TV camera used in the real-time digital radiography system often includes of two major sections, i.e., the image sensing part and the control part as mentioned in item (2) of the preceding paragraph. Generally, the image sensing part is installed in the X-ray room where X-ray images are produced, and the control part is placed in the control room where the inspector operates various apparatus. The image sensing part and the control part of the TV camera are connected with each other through connectors and cables, and each of these parts is interchangeable among TV cameras of the same type. Based on this device compatibility, a switching means as mentioned in item (2) is provided between the image sensing parts and control part of TV camera, so that the system performance includes the functions of a plurality of image input devices.

By employment of the foregoing two kinds of parts, the system components after the A/D converters as mentioned in item (1), or after the control part as mentioned in item (2) can be used commonly, whereby input image data can have a standardized format.

Moreover, clinical information material of different types and different qualities can be equally treated as image data, whereby the total management of image data for merging and editing is made possible and contributes significantly to the enhanced efficiency of data management and search. In addition, a single image processing system deals with the outputs of a plurality of TV cameras, and the overall system throughput relative to the system cost can be enhanced.

As an example of an operation, an X-ray film, patient's diagnostic clinical chart and various examination reports, with a patient identification code being appended thereto, are entered as television images at individual storage locations and this information is converted into digital information in the same manner as for the input image from the real-time digital radiography system, and the total management for these image data is made possible. Consequently, the inventive real-time digital radiography system contributes significantly to the reduction of storage space for clinical information materials, which is a growing problem in large hospitals, and to the simplification of the search work for X-ray images.

Next, embodiments of the present invention will be explained in detail.

Figure 1:
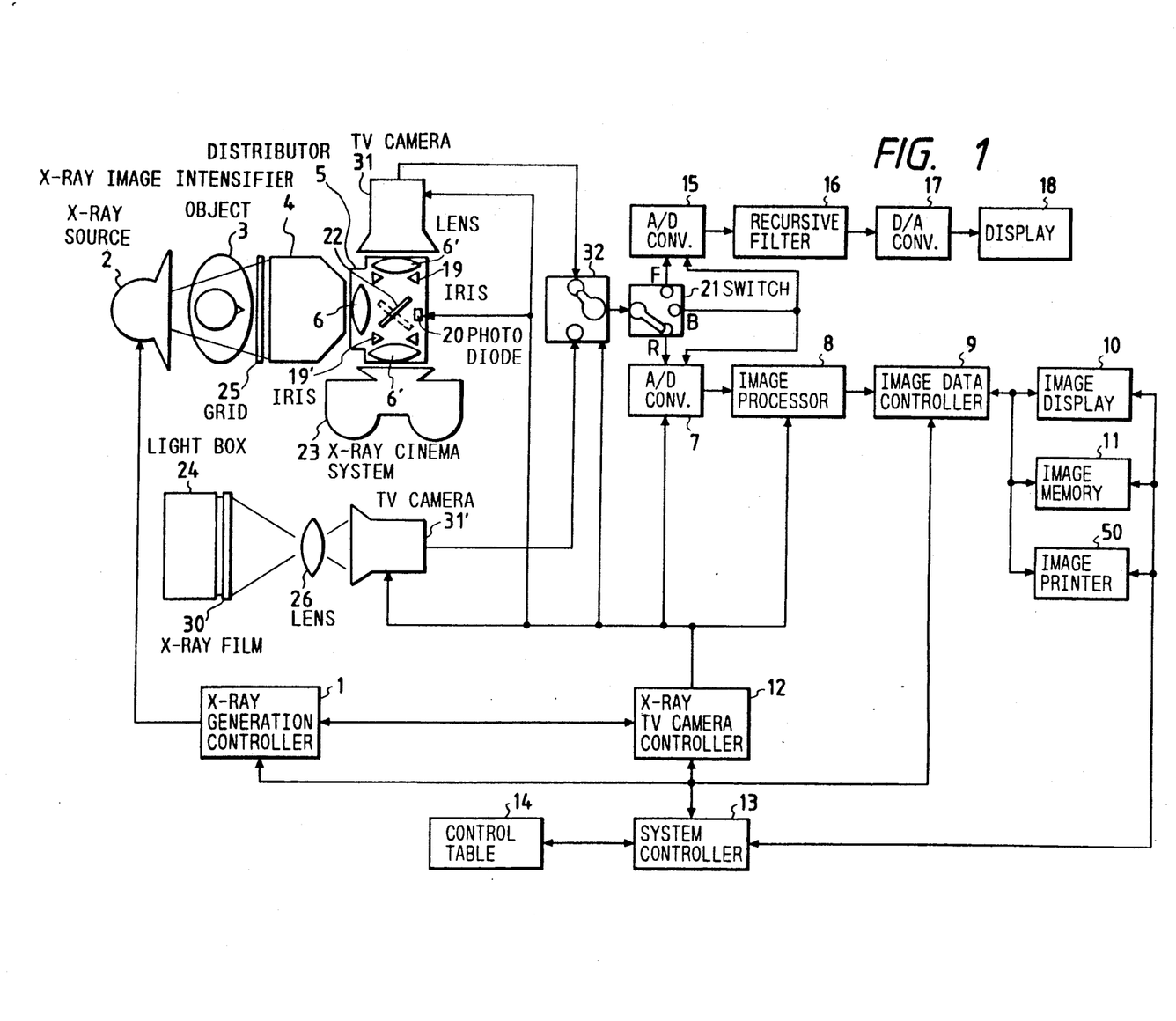
FIG. 1 is a block diagram showing the basic arrangement of the real-time digital radiography system based on an embodiment of this invention.

FIG. 1 shows in a block diagram the real-time digital radiography system based on an embodiment of this invention. The X-rays generated by an X-ray tube 2 are projected to an object 3. The X-ray dosage is controlled by an X-ray generation controller 1. An X-ray image intensifier 4 produces an optical image from information carried by the X-rays which have passed through a grid 25 that eliminates the blur of the image caused by the dispersion of X-rays in the object 3. The optical image is focused by coupling optics 5 onto the imaging plane of the TV camera. The coupling optics 5 includes a first lens system 6 which converts the output optical image from the X-ray image intensifier 4 into a parallel light beam, a mirror 22 which deflects the path of the parallel light beam, an optical iris 19 which adjusts the amount of light incident to the TV camera 31, a second lens system 6' which focuses the parallel light beam to the TV camera 31, and a photodiode 20 which is used to measure the luminance at the output of the lens system 6'. In the coupling optics 5, the mirror 22 is used to determine, through the rotation thereof, for example, the path of the output optical image produced by the X-ray image intensifier 4.

The X-ray image intensifier has its output optical image used for the high-speed X-ray cinema by utilization of the high sensitivity of the X-ray image intensifier and the X-ray spot camera photography based on low-dose X-rays, besides the X-ray filming by use of the real-time digital radiography system. Since these photographic implementations are based on independent devices, the optical image is directed to these devices by turning the mirror 22 provided in coupling optics 5, according to this invention, so as to avoid the installation and orientation for the operation of each device when the image from the X-ray image intensifier has a fixed output path. Specifically, the mirror 22 is inclined by 45° at a time with respect to the optical axis of the output optical image from the X-ray image intensifier, so that the optical image from the X-ray image intensifier is directed in steps to the TV camera 31, an X-ray cinema system indicated by 23 in FIG. 1, an X-ray spot camera, for example disposed on the circumferential positions scanned by the optical axis of the image.

The selector switch 32 located between the TV camera 31 and A/D converters 15 and 7 is to connect one of TV cameras to an A/D converter in response to the command from the input controller. A TV camera to be connected for operation can be selected arbitrarily by using a switch (not shown) on the control console 14. Accordingly, by providing several TV cameras, it is possible for the single real-time digital radiography system to have a digital image conversion for optical images of different qualities, e.g., X-ray films, patient's clinical chart and examination reports, through a simple switching operation by the operator. The selector switch 32 is normally set to the position for selecting the output optical image from the X-ray image intensifier which is used most frequently in the system.

The TV camera 31 incorporates an image pickup device for converting an optical image into an electrical signal, and it produces a video signal of the output image of the X-ray image intensifier received from the coupling optics. The image pickup device is an image pickup tube in this embodiment.

The TV camera 31 has four scanning modes that are different with respect to the frame rate, the number of scanning lines, and the scanning operation. The first scanning mode is based on the NTSC system operating at 30 frames/sec, 525 scanning lines per frame, and a 2-to-1 interlacing scheme. This first scanning mode is used for the fluoroscopy in which low-dose X-rays are projected to an object continuously and the resulting image is monitored on a real-time basis. The signal path selector switch 21 is placed at position F. Accordingly, the video signal provided by the TV camera is fed to the A/D converter 15, and the digital output is delivered to a display unit 18 for the fluoroscopic observation by way of a recursive filter 16 and D/A converter 17. The recursive filter 16 has a role of adding proper image persistent characteristics in order to prevent the flicker of the image on the display unit 18. The foregoing system configuration may be simplified by conducting the video signal on the F-contact of the switch 21 to the display unit 18 directly.

The second, third and fourth scanning modes are intended for the filming mode used for the diagnosis through the irradiation of X-rays at higher dosages than the case of the above-mentioned fluoroscopy mode. In any of these modes, with the switch 21 being set to position R, for example, the video signal provided by the TV camera 31 is converted into a digital signal by the A/D converter 7, and digital signal is delivered to an image data controller 9 by way of an image processor 8. The image processor 8 accomplishes the correction of the $\gamma$ characteristics of the image pickup tube and logarithmic data conversion based on a table-lookup scheme. The image data controller 9 controls display or storing of the image signal in accordance with the command from the system controller 13, so that the image is displayed on the image display unit 10, stored in the image memory 11, or printed on the image printer 50. The image data may be delivered to a plurality of image display units 10 installed in different places.

The control console 14 has an assortment of control switches, which include a switch for selecting the fluoroscopy mode or filming mode, a switch for selecting the second, third or fourth mode of the filming mode, a switch for specifying the condition of data modification, a switch for storing the image in the image memory 11, a switch for printing the image on the image printer 50, and a switch for setting the X-ray dosage. The system controller 13 issues commands to all system sections in compliance with the setting of these switches.

Next, a specific example of the system operation will be explained, starting with the explanation of the command issued to the X-ray generation controller 1 and the control of the incident light input to the TV camera. With the fluoroscopy mode being selected by the switch on the control console 14, the system controller 13 indicates the standard value of the X-ray dosage for the fluoroscopy, for example, 1 $\mu$R (micro-Roentgen) for one picture (specifically, it selects an X-ray tube voltage of 60–80 kV and an X-ray tube current of 1–4 nA), to the X-ray generation controller 1. In the filming mode, on the other hand, several kinds of X-ray dosages can be selected by the switch (not shown) on the control console 14. The range of dosage is from 20 to 1000 times the standard value for the fluoroscopy mode, for example. The system controller 13 indicates the selected X-ray dosage to the X-ray generation controller 1, and at the same time indicates the corresponding aperture stop value of the optical iris 19 to the TV camera controller 12. The TV camera controller 12 bases its operation on the program to control the aperture stop of the optical iris 19 in response to the command. The TV camera controller 12 incorporates a reference value memory which stores the reference values of correction data (incident light input) for making a constant incident light input to the TV camera in correspondence to each specified X-ray dosage. The TV camera controller 12 further incorporates a feedback controller which issues the X-ray dosage control signal to the X-ray generation controller 1 so that the luminance level measured by the photodiode 20 is consistent with the reference value read out of the reference value memory. Accordingly, the X-ray dosage has a reference dose value selected on the control console 14, and yet it is adjusted so that the incident light input to the TV camera is equal to the reference value corresponding to the selected dosage.

Specified values of X-ray dosage have a 1000-fold difference between the minimum and maximum values, and therefore even with the programmed control for the optical iris for the light input adjustment, there arises a difference of 50–100 fold between the maximum and minimum reference values of incident light input, i.e., the incident light input to the TV camera which is adjusted actually by feedback control, corresponding to all dosages.

Next, the details of each scanning mode and the control of the TV camera 31 will be explained with reference to the following table. In the table, symbol "↑" denotes that the entry of the above field is applied equally to this field.

TABLE 1

| Mode | Scanning | Frame rate | Scanning line number | Matrix size | Scanning area of image tube |
|---|---|---|---|---|---|
| 1 (*F) | Interlace | 30 frames/sec. | 525 lines | 480 × 512 | $15^{mm} \times 15^{mm}$ or $30^{mm} \times 30^{mm}$ |
| 2 | Non Int. | 60 | 525 | 512 × 512 | ↑ |
| 3 | ↑ | 15 | 1050 | 1024 × 1024 | ↑ |
| 4 | ↑ | 3.75 | 2100 | 2048 × 2048 | ↑ |
| 5 | ↑ | 1.87 | 4200 | 4096 × 4096 | ↑ |

*(F): Fluoroscopy mode

As shown in Table 1, the first mode, which is the fluoroscopy mode for displaying a fluoroscopic image on the display unit 18, employs 525 scanning lines per frame, 30 frames/sec, and 2-to-1 frame interlace beam scanning or NTSC-based scanning. In this mode, the A/D converter 7 samples 480-by-512 pixels for a frame.

The second, third and fourth modes are filming modes based on non-interlace beam scanning. These modes employ 525, 1050 and 2100 scanning lines, and 60 frames/sec, 15 frames/sec and 3.75 frames/sec, respectively, for the same effective scanning area of the TV camera. The second mode is intended for the higher time resolution, having 512-by-512 pixels. The fourth mode is intended for the higher spatial resolution, having 2048-by-2048 pixels. The third mode has intermediate features between the second and fourth modes.

The SATICON's diameter can be selected between 1 to 5 inches, and there is further provided with the fifth mode in which a 1-inch SATICON is replaced with a 2-inch SATICON with the intention of a more enhanced spatial resolution. In this case, the scanning area is set between 30-by-30 mm to 32-by-32 mm, with the inscribed circle within the area (having a diameter of 30–32 mm) being the effective scanning area. The fifth mode has 4200 scanning lines, 1.87 frames/sec and 4096-by-4096 pixels, and operates based on the non-interlace beam scanning. The above-mentioned SATICON (registered trade mark of NHK) is a charge coupled device using a non-injection photo-conductor which resembles the Pin photodiode, exhibiting superior persistence characteristics and dark current characteristics which contribute to a high s/n ratio. In addition, the SATICON photo-conductor is stable in the air and it is suitable for various image pickup devices including that of the present invention.

Figure 2:
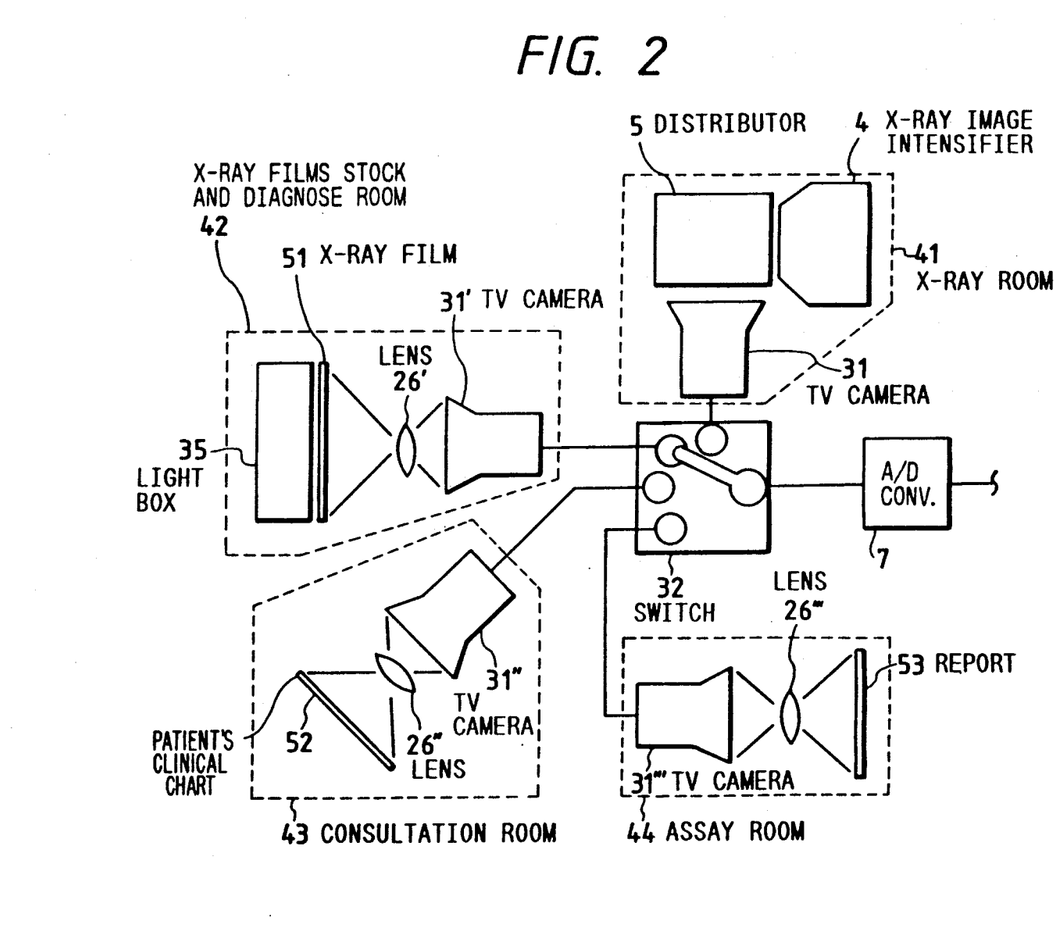
FIG. 2 is a block diagram showing a first embodiment of the use of the inventive system.

FIG. 2 shows a specific embodiment of the usage of the selector switch 32 and a plurality of TV cameras. In this embodiment, four TV cameras are used, and they are disposed in completely separate rooms including an X-ray room 41, an X-ray film stock and diagnose room 42, a consultation room 43, and an assay room 44.

FIG. 3 shows another embodiment, in which a selector switch 32' is disposed between a plurality of TV cameras and the controller. In this case, the selector switch 32 shown in FIG. 2 is not needed, and four TV cameras are installed in completely separate rooms including an X-ray room 41, an X-ray film stock and diagnose room 42, a consultation room 43, and an assay room 44, as in the embodiment of FIG. 2.

The operations of these embodiments of FIGS. 2 and 3 are basically the same, and the following explains only the embodiment shown in FIG. 2. In the X-ray room 41, the TV camera 31, X-ray image intensifier 4 and coupling optics 5 constitute an X-ray TV camera system, and the TV camera 31 is used for the fluoroscopy and filming of X-ray images that are the inherent functions of the real-time digital radiography system as described previously. It should be noted that the system section 31 enclosed by the dash-dot line in FIG. 3 corresponds to the TV camera 31 in FIG. 2.

The TV camera 31' installed in the X-ray film stock and diagnose room 42 is used for the digital image conversion of film records of X-ray images which have been used dominantly in the X-ray image diagnosis at present. Currently, a large number of X-ray images are filmed every day, and the insufficiency of film storage space and the awkwardness of film search work are among the growing problems particularly in large hospitals. To cope with this matter, X-ray images are converted into digital data by using the foregoing TV camera and stored in such a spacious information storage medium as optical disks, so that an intended X-ray image can be referenced promptly whenever it is necessary and, at the same time, the film storage space can be reduced and the search work can be simplified. Moreover, through the digital image conversion, it becomes possible to handle image data easily with a computer, and the accuracy of diagnosis can be enhanced through various PACS-based image processings.

It is necessary for the digital image conversion process to retain enormous information carried by the X-ray film which has a very high resolution. This means that a TV camera used for this process is required to have a high resolution comparable to the X-ray film. Specifically, X-ray images used for the diagnosis of the heart and other vascular organs need 1024-by-1024 pixels or more, images used for the diagnosis of the stomach and other alimentary canels need 2048-by-2048 pixels or more, and images used for the diagnosis of the lung and other chest organs need 4096-by-4096 pixels or more. On this account, digital image conversion for film records of X-ray images is carried out in the third, fourth or fifth mode which provides a high resolution. The patient's identification code is entered simultaneously in the digitizing process for the X-ray image.

The TV camera 31" installed in the clinic room 43 is used for the digital conversion of the patient's diagnostic clinical chart described by the doctor. At present, a doctor in the clinic room writes the status of diagnosis of a patient on the patient's clinical chart by hand. Each patient needs at least one patient's clinical chart, and a large hospital has a problem of storing enormous patient's clinical charts for a large number of patients. If the contents of patient's clinical chart is converted into digital data, it can be stored on a mass information storage medium such as optical disks, as for X-ray films, and their storage space can be reduced significantly. The patient's clinical chart is confidential material which is referenced only by the doctors, and an electronic patient's clinical chart can readily be provided with a lock facility by software basis to prevent the illegal access through the computer system thereby to ensure the secrecy of the patient's clinical chart.

Figure 4:
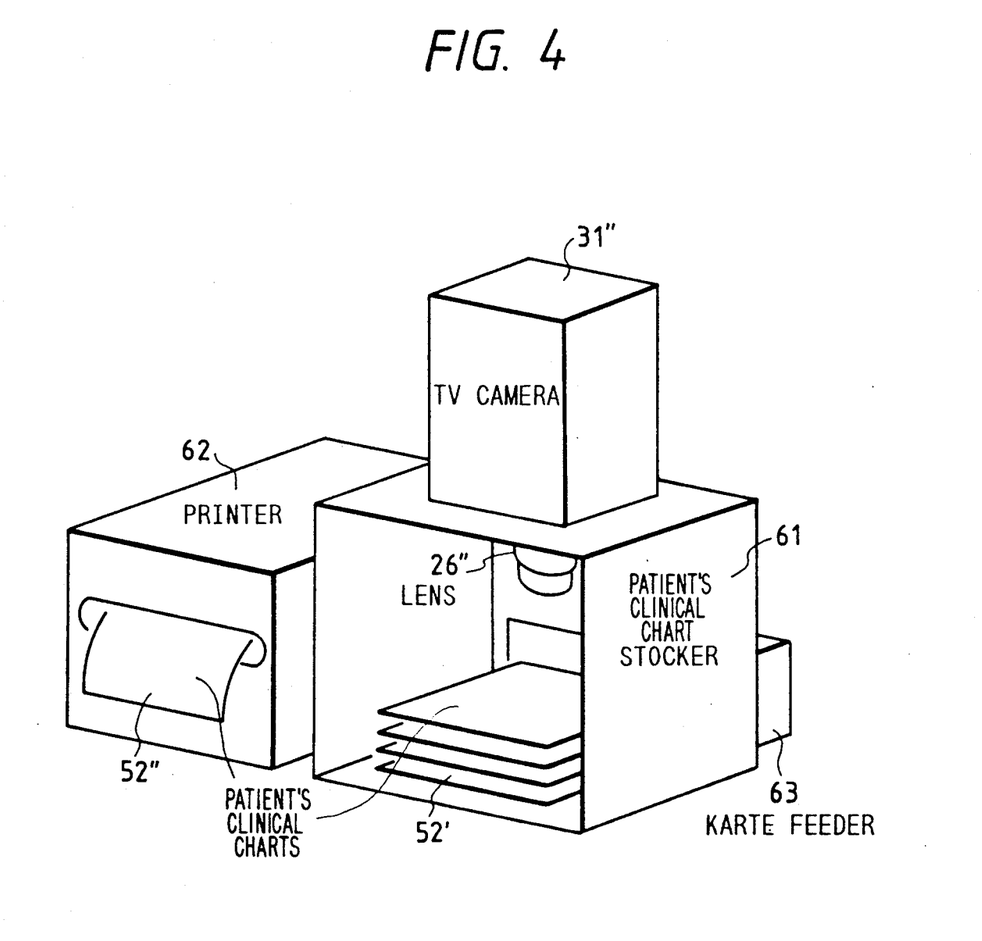
FIG. 4 is an explanatory diagram for the first embodiment of the use of the inventive system.

FIG. 4 shows the operation of this embodiment in the clinic room. A doctor prepares a patient's clinical chart 52' with the same format as used currently for the diagnosis, with an identification code being appended thereto. The doctor describes the patient's clinical chart in the conventional manner and places it in a patient's clinical chart stocker 61 equipped with a TV camera 31" on completion of diagnosis. In this manner, a number of patient's clinical chart are piled in the patient's clinical chart stocker as the doctor completes the diagnosis for patients. At the end of the day when the X-ray image filming with the real-time digital radiography system has completed, the TV camera 31" is activated through the operation of control console, and each sheet of the described patient's clinical chart is converted into digital image and stored in the memory 11 shown in FIG. 1. In this operation, the patient's clinical chart can be handled automatically through the provision of a patient's clinical chart feeder 63. Once the contents of a patient's clinical chart has been stored as digital data, it is accessed for updating based on the identification code. The original patient's clinical chart is discarded immediately after its image has been stored. At the next clinical occasion, the patient's identification code is entered to produce a hardcopy of the latest patient's clinical chart on the printer, and it is written by the doctor.

The TV camera 31''' installed in the assay room 44 is used for converting inspection reports produced in this room into digital data. The usage of the TV camera 31''' is identical to the case of handling patient's clinical chart in the clinical room, and the explanation thereof will not be repeated.

The images treated in the foregoing sections of the system are controlled generally through the patient's identification code, and can be accessed arbitrarily when necessary.

Besides the inherent functions of the real-time digital radiography system, the foregoing embodiment is additionally effective for accomplishing the total management of clinical information materials of individual patients, the reduction of their storage space, and the simplification of search work, through the addition of the function for converting clinical information materials of different qualities, such as film records of X-ray images, diagnostic patient's clinical charts, and reports, into digital images by using the same system.

The present invention provides the following effectiveness.

(1) Through the single path entry using a plurality of TV cameras, clinical information materials of different types and different qualities can be standardized as digital image data. Data of the conventional form can also be rendered the digital conversion, whereby important information can be preserved, the storage space for various information mediums can be reduced, and information search work can be simplified.

(2) Through the digital conversion of X-ray images, the advancement or the cure of illness can be expressed quantitatively, which enables the quantitative analysis and anticipation of illness and treatment.

(3) The ability of the digital conversion of clinical information materials of different types and different qualities eliminates the need for specialized digital converters for individual materials, and the real-time digital radiography system achieves a high system performance for its cost.

(4) By appending the patient's identification code to all related digitized clinical information materials, the total management of clinical information of each patient is made possible, and it enhances the efficiency of diagnosis.

(5) Through the digital conversion of clinical information materials of various types, the system can be connected to such a network as PACS, and it enables easy and prompt communication with other digital image processing apparatus.

What is claimed is:

1. A real-time digital radiography system comprising:
an X-ray source for projecting x-rays to an object and for producing x-ray image information by transmitting the x-rays through said object;
an x-ray television camera system for converting the x-ray image information to digital image information, said x-ray television camera system including:
an x-ray image intensifier for producing an optical image from the x-ray information,
coupling optics for focusing the optical image,
a first TV camera for converting the optical image to optical image data,
an A/D converter for converting the optical image data to said digital image information,
an image processing device for processing the digital image information,
a display device for displaying the processed digital image information, and
a memory device for storing the processed digital image information;
a second TV camera for converting a second image from an x-ray film to the optical image data;
a third TV camera for converting a third image of medical information recorded on paper to the optical image data; and
means for selectively connecting said first TV camera, said second TV camera and said third TV camera to said A/D converter.

2. A real-time digital radiography system according to claim 1, wherein said first TV camera includes an image pickup tube having a non-injection photo-conductor.

3. A real-time digital radiography system according to claim 1, wherein said first TV camera includes a charge coupled device.

4. A real-time digital radiography system according to claim 2, wherein said non-injection photo-conductor is a SATICON.

5. A real-time digital radiography system according to claim 2, wherein said image pickup tube has a nominal diameter having a range of 10 mm to 60 mm.

6. A real-time digital radiography system comprising:
an X-ray source for projecting x-rays to an object and for producing x-ray image information by transmitting the x-rays through said object;
an x-ray television camera system for converting the x-ray image information to digital image information, said x-ray television camera system including:
an x-ray image intensifier for producing an optical image from the x-ray information;
coupling optics for focusing the optical image,
a first TV camera for converting the optical image to optical image data,
an A/D converter for converting the optical image data to said digital image information,
an image processing device for processing the digital image information,
a display device for displaying the processed digital image information, and
a memory device for storing the processed digital image information;
a second TV camera for converting a second image to said optical image data; and
means for selectively connecting said first TV camera and said second TV camera to said A/D converter, and wherein said first TV camera has a plurality of operating modes, with at least one of said modes forming an image having between $2000^2$ and $4500^2$ pixels.

7. A real-time digital radiography system comprising:
an X-ray source for projecting x-rays to an object and for producing x-ray image information by transmitting the x-rays through said object;
an x-ray television camera system for converting the x-ray image information to digital image information, said x-ray television camera system including:
an x-ray image intensifier for producing an optical image from the x-ray information;
coupling optics for focusing the optical image,
a first TV camera for converting the optical image to optical image data,
an A/D converter for converting the optical image data to said digital image information,
an image processing device for processing the digital image information, a display device for displaying the processed digital image information, and a memory device for storing the processed optical image information;

a second TV camera for converting a second image from an x-ray film to the optical image data;

said second TV camera having a mode for generating pixel image data having at least 1024×1024 pixels;

a third TV camera for converting a third image of medical information recorded on paper to the optical image data; and means for selectively connecting said first TV camera, said second TV camera and said third TV camera.

* * * * *